United States Patent
Saiki et al.

(10) Patent No.: US 11,423,341 B2
(45) Date of Patent: Aug. 23, 2022

(54) CONSTRUCTION MANAGEMENT SYSTEM AND CONSTRUCTION MANAGEMENT METHOD

(71) Applicant: KOBELCO CONSTRUCTION MACHINERY CO., LTD., Hiroshima (JP)

(72) Inventors: Seiji Saiki, Hiroshima (JP); Yoichiro Yamazaki, Hiroshima (JP)

(73) Assignee: KOBELCO CONSTRUCTION MACHINERY CO., LTD., Hiroshima (JP)

( * ) Notice: Subject to any disclaimer, the term of this patent is extended or adjusted under 35 U.S.C. 154(b) by 0 days.

(21) Appl. No.: 16/973,615

(22) PCT Filed: May 24, 2019

(86) PCT No.: PCT/JP2019/020740
§ 371 (c)(1),
(2) Date: Dec. 9, 2020

(87) PCT Pub. No.: WO2019/239858
PCT Pub. Date: Dec. 19, 2019

(65) Prior Publication Data
US 2021/0256457 A1    Aug. 19, 2021

(30) Foreign Application Priority Data
Jun. 12, 2018  (JP) .............................. JP2018-112097

(51) Int. Cl.
*G06Q 50/08* (2012.01)
*G06Q 10/06* (2012.01)
(Continued)

(52) U.S. Cl.
CPC ...... *G06Q 10/063114* (2013.01); *E02F 9/205* (2013.01); *E02F 9/261* (2013.01); *G06Q 10/06314* (2013.01); *G06Q 50/08* (2013.01)

(58) Field of Classification Search
None
See application file for complete search history.

(56) References Cited

U.S. PATENT DOCUMENTS 10,921,771 B2 * 2/2021 Bramberger ............. G09B 9/04
10,954,651 B2 * 3/2021 Hashimoto ............. E02F 9/205
(Continued)

FOREIGN PATENT DOCUMENTS

JP    2002-108975 A    4/2002
JP    2002-304441 A    10/2002
(Continued)

OTHER PUBLICATIONS

Evaluation System for Hydraulic Excavator Operation Skill Using Remote Controlled Excavator and Virtual Reality Sekizuka, Ryota; Ito, Masaru; Saiki, Seiji; Yamazaki, Yoichiro; Kurita, Yuichi. 2019 IEEE/RSJ International Conference on Intelligent Robots and Systems (IROS): 3229-34. IEEE. (2019) (Year: 2019).*

(Continued)

*Primary Examiner* — Folashade Anderson
(74) *Attorney, Agent, or Firm* — Oblon, McClelland, Maier & Neustadt, L.L.P.

(57) ABSTRACT

A manager terminal generates work plan information that is information regarding a work plan by at least one work machine, set for each operator who remotely operates the at least one work machine, and includes a work item by the work machine that is remotely operated by the operator and work time for the work item based on contents input by a construction manager, and inputs the work plan information into a server. The server generates progress information (Continued)

indicating work progress of the operator for the at least one work machine based on the work plan information input from the manager terminal and work information input from at least one work information acquisition unit, inputs the progress information into the manager terminal, and presents the progress information to the construction manager.

5 Claims, 9 Drawing Sheets

(51) Int. Cl.
   *E02F 9/20* (2006.01)
   *E02F 9/26* (2006.01)

(56) References Cited

U.S. PATENT DOCUMENTS

| | | | | |
|---|---|---|---|---|
| 11,092,976 | B2* | 8/2021 | Koga | H04N 7/185 |
| 2004/0010561 | A1* | 1/2004 | Kim | H04L 41/0266 709/208 |
| 2004/0059539 | A1* | 3/2004 | Otsuki | G01C 15/00 702/150 |
| 2004/0148083 | A1* | 7/2004 | Arakawa | G07C 5/085 701/50 |
| 2009/0312052 | A1* | 12/2009 | Barbosa | H04W 64/00 455/556.1 |
| 2011/0320015 | A1* | 12/2011 | Yun | H04Q 9/00 700/19 |
| 2012/0154572 | A1* | 6/2012 | Stratton | G05D 1/0044 348/114 |
| 2016/0321763 | A1* | 11/2016 | Shike | G06Q 10/06313 |
| 2017/0132568 | A1* | 5/2017 | Glunz | G06Q 10/101 |
| 2017/0328030 | A1 | 11/2017 | Yamada et al. | |
| 2018/0137446 | A1 | 5/2018 | Shike et al. | |
| 2019/0039862 | A1* | 2/2019 | Palberg | E02F 9/166 |
| 2019/0284027 | A1* | 9/2019 | Albrecht | B66F 9/0755 |
| 2021/0072727 | A1* | 3/2021 | Stanger | E02F 9/262 |
| 2021/0073711 | A1* | 3/2021 | Saiki | G06Q 10/08 |

FOREIGN PATENT DOCUMENTS

| | | |
|---|---|---|
| JP | 5650865 B1 | 1/2015 |
| JP | 2015-124514 A | 7/2015 |
| WO | WO 2012/145788 A1 | 11/2012 |
| WO | WO 2016/121010 A1 | 8/2016 |
| WO | WO 2017/061516 A1 | 4/2017 |
| WO | WO 2017/061517 A1 | 4/2017 |

OTHER PUBLICATIONS

Masaru, I., Yusuke, F., Seiji, S., Yoichiro, Y., & Yuichi, K. (2019). Development of a cross-platform cockpit for simulated and teleoperated excavators. Journal of Robotics and Mechatronics, 31(2), 231-239. doi:http://dx.doi.org/10.20965/jrm.2019.p0231 (Year: 2019).*
Extended European Search Report dated Jun. 23, 2021 in European Patent Application No. 19820392.9, 8 pages.
International Search Report dated Aug. 27, 2019 in PCT/JP2019/020740 filed on May 24, 2019, 1 page.
Notice of Reasons for Refusal dated Nov. 24, 2021 in Japanese Patent Application No. 2018-112097 (with English machine translation), 8 pages.

* cited by examiner

FIG. 2B

WORK SCHEDULE INFORMATION

| WORK MACHINE | MACHINE INFORMATION | | | WORK SCHEDULE (SUNDAY, APRIL 3) T1 | | | | | | | | | | | |
|---|---|---|---|---|---|---|---|---|---|---|---|---|---|---|---|
| | MODEL | ATT | TIP ATT | WORK ITEM | 8 | 9 | 10 | 11 | 12 | 13 | 14 | 15 | 16 | 17 | 18 |
| UNIT 1 | SK200-10 | STANDARD | BUCKET | DIGGING AND LOADING | ▨ | | | | | | | | | | |
| | | | | LEVELING OF LEVEL GROUND | | | ▨ | ▨ | | | | | | | |
| | | | | SHAPING OF LEVEL GROUND | | | | | | ▨ | ▨ | ▨ | | | |
| | | | | LEVELING OF SLOPE FACE | | | | | | | | | ▨ | ▨ | |
| | | | | SHAPING OF SLOPE FACE | | | | | | | | | | | |
| UNIT 2 | SK135SR-5 | STANDARD | BUCKET | DIGGING AND LOADING | | ▨ | | | | | | | | | |
| | | | | LEVELING OF LEVEL GROUND | | | | ▨ | ▨ | | | | | | |
| | | | | SHAPING OF LEVEL GROUND | | | | | | | | | | | |
| | | | | LEVELING OF SLOPE FACE | | | | | | ▨ | ▨ | ▨ | | | |
| | | | | SHAPING OF SLOPE FACE | | | | | | | | | ▨ | ▨ | |
| UNIT 3 | SK250-10 | STANDARD | BUCKET | DIGGING AND LOADING | | | | | | | | | | | |
| | | | | LEVELING OF LEVEL GROUND | | | | | | | | | | | |
| | | | | SHAPING OF LEVEL GROUND | | | | | | | | | | | |
| | | | | LEVELING OF SLOPE FACE | | | | | | | | | | | |
| | | | | SHAPING OF SLOPE FACE | | | | | | ▨ | ▨ | ▨ | | | |

FIG. 3

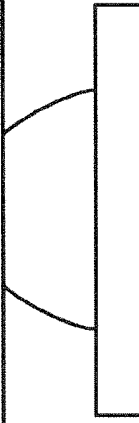

WORK PROGRESS INFORMATION

| WORK MACHINE | OPERATOR INFORMATION ||||| WORK TIME | WORK ITEM | PROGRESS SITUATION (SUNDAY, APRIL 3) |||||||||||
|---|---|---|---|---|---|---|---|---|---|---|---|---|---|---|---|---|---|
| | LIVE VIDEO | NAME | RANK | PHYSICAL CONDITION | REMOTE OPERATION LOCATION | NATIONALITY | | | 8 | 9 | 10 | 11 | 12 | 13 | 14 | 15 | 16 | 17 | 18 |
| UNIT 1 | 👤 | KOBELCO TARO | A | GOOD | HIROSHIMA, JAPAN | JAPAN | 5 HOURS 30 MINUTES | DIGGING AND LOADING | | | | | | | | | | |
| | | | | | | | | LEVELING OF LEVEL GROUND | | | | | | | | | | |
| | | | | | | | | SHAPING OF SLOPE FACE | | | | | | | | | | |
| UNIT 2 | 👤 | Mr. KoBelco | B | GOOD | Frankfurt, GERMANY | GERMANY | 4 HOURS 30 MINUTES | LEVELING OF SLOPE FACE | | | | | | | | | | |
| | | | | | | | | SHAPING OF SLOPE FACE | | | | | | | | | | |
| | | | | | | | | DIGGING AND LOADING | | | | | | | | | | |
| | | | | | | | | LEVELING OF LEVEL GROUND | | | | | | | | | | |
| | | | | | | | | SHAPING OF SLOPE FACE | | | | | | | | | | |
| UNIT 3 | 👤 | KOBELCO HANAKO | F | GOOD | TOKYO, JAPAN | JAPAN | 1 HOUR 30 MINUTES | DIGGING AND LOADING | | | | | | | | | | |
| | | | | | | | | LEVELING OF LEVEL GROUND | | | | | | | | | | |
| | | | | | | | | SHAPING OF SLOPE FACE | | | | | | | | | | |
| | | | | | | | | LEVELING OF SLOPE FACE | | | | | | | | | | |
| | | | | | | | | SHAPING OF SLOPE FACE | | | | | | | | | | |

T2   G2

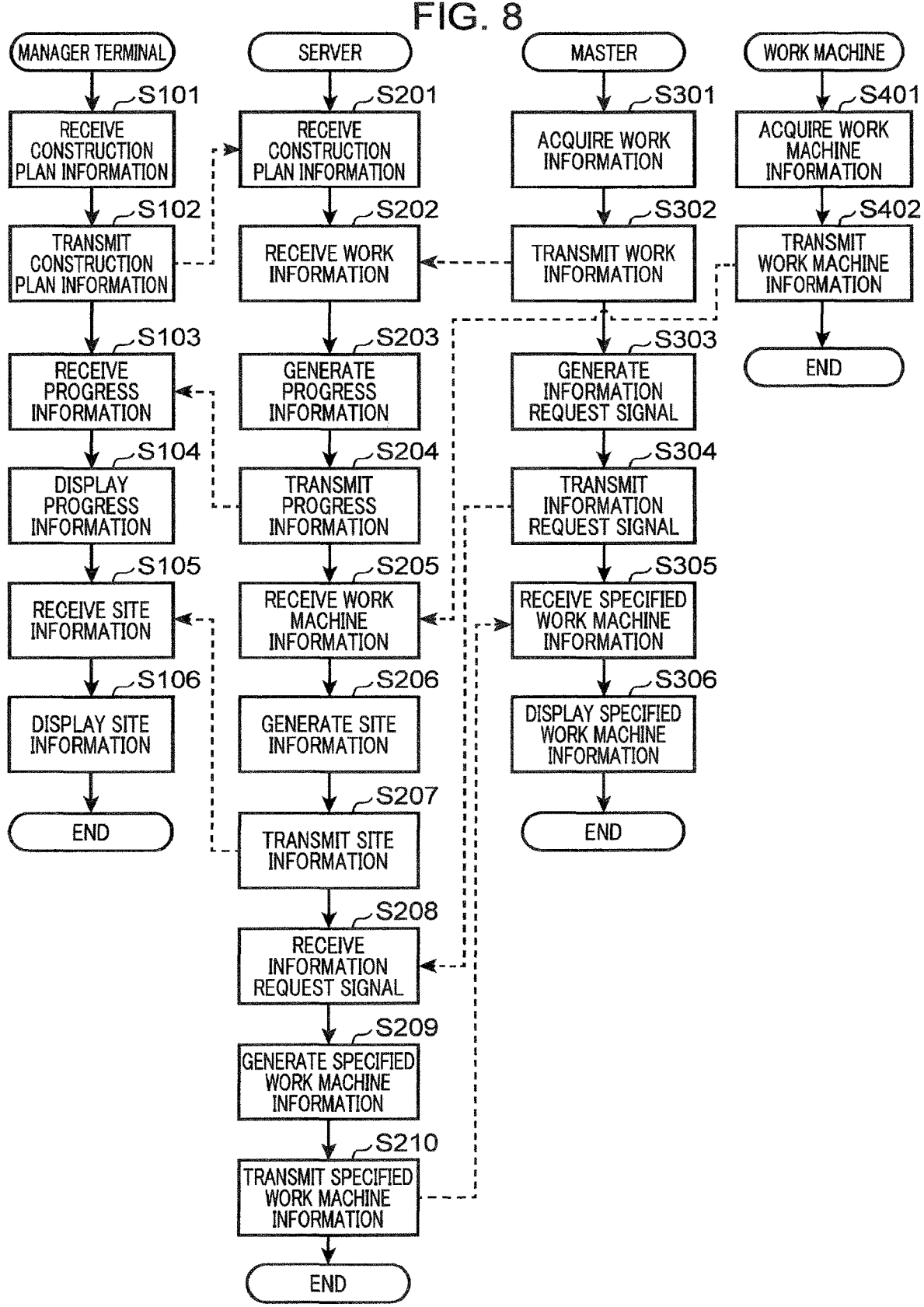

CONSTRUCTION MANAGEMENT SYSTEM AND CONSTRUCTION MANAGEMENT METHOD

TECHNICAL FIELD

The present invention relates to a construction management system and a construction management method for managing work progress at a work site by at least one remotely operated work machine.

BACKGROUND ART

In recent years, the shortage of work machine operators has become serious with the aging of operators. Therefore, expectations are growing for a remote operation system with which an operator operates a work machine remotely without going to a work site.

The remote operation system makes it possible to recruit operators not only from all domestic regions but also from other countries, which makes it easy to secure operators. In addition, with the remote operation system, work can be performed by using the time difference such that domestic operators perform work during the daytime and operators in other countries perform work during the nighttime, which allows significant reduction in the work period.

However, in the remote operation system, there is no operator at the work site, and a plurality of operators does not always start work at the same time. Therefore, it is difficult for a construction manager who supervises the work at the work site to manage the work progress at the work site.

Patent Literature 1 discloses a management system that checks the work progress of each of a plurality of work groups at a location away from a work site. However, since Patent Literature 1 does not assume the remote operation system, the above problem does not occur and the problem cannot be solved.

CITATION LIST

Patent Literature

Patent Literature 1: JP 2002-108975 A

SUMMARY OF INVENTION

An object of the present invention is to provide a construction management system and a construction management method that allow easy management of the work progress at a work site by at least one remotely operated work machine.

One aspect of the present disclosure is a construction management system for managing work progress at a work site by at least one work machine that is remotely operated. The construction management system includes: a manager terminal configured to allow a construction manager to manage the work progress by the at least one work machine; a server connected to the manager terminal to allow communication; and at least one work information acquisition device provided corresponding to the at least one work machine and configured to acquire work information regarding a work situation of the at least one work machine and to input the work information into the server, in which the manager terminal includes a work plan information generation unit configured to generate work plan information regarding a work plan of the at least one work machine based on contents input by the construction manager and to input the work plan information into the server, the work plan information is set for each operator who remotely operates the at least one work machine and includes a work item of the work machine remotely operated by each operator and work time for the work item, and the server includes a progress information generation unit configured to generate progress information indicating the work progress of the operator, to input the progress information into the manager terminal, and to present the progress information to the construction manager for each of the at least one work machine based on the work plan information and the work information.

BRIEF DESCRIPTION OF DRAWINGS

FIG. 2B is an enlarged view of a table shown in FIG. 2A.

FIG. 3 is a view showing one example of a screen displayed on the manager terminal when the construction manager manages work progress by a plurality of work machines.

FIG. 8 is a flowchart showing processing of the construction management system according to the embodiment of the present invention.

DESCRIPTION OF EMBODIMENT

An embodiment of the present invention will be described in detail below with reference to the accompanying drawings.

Figure 1:
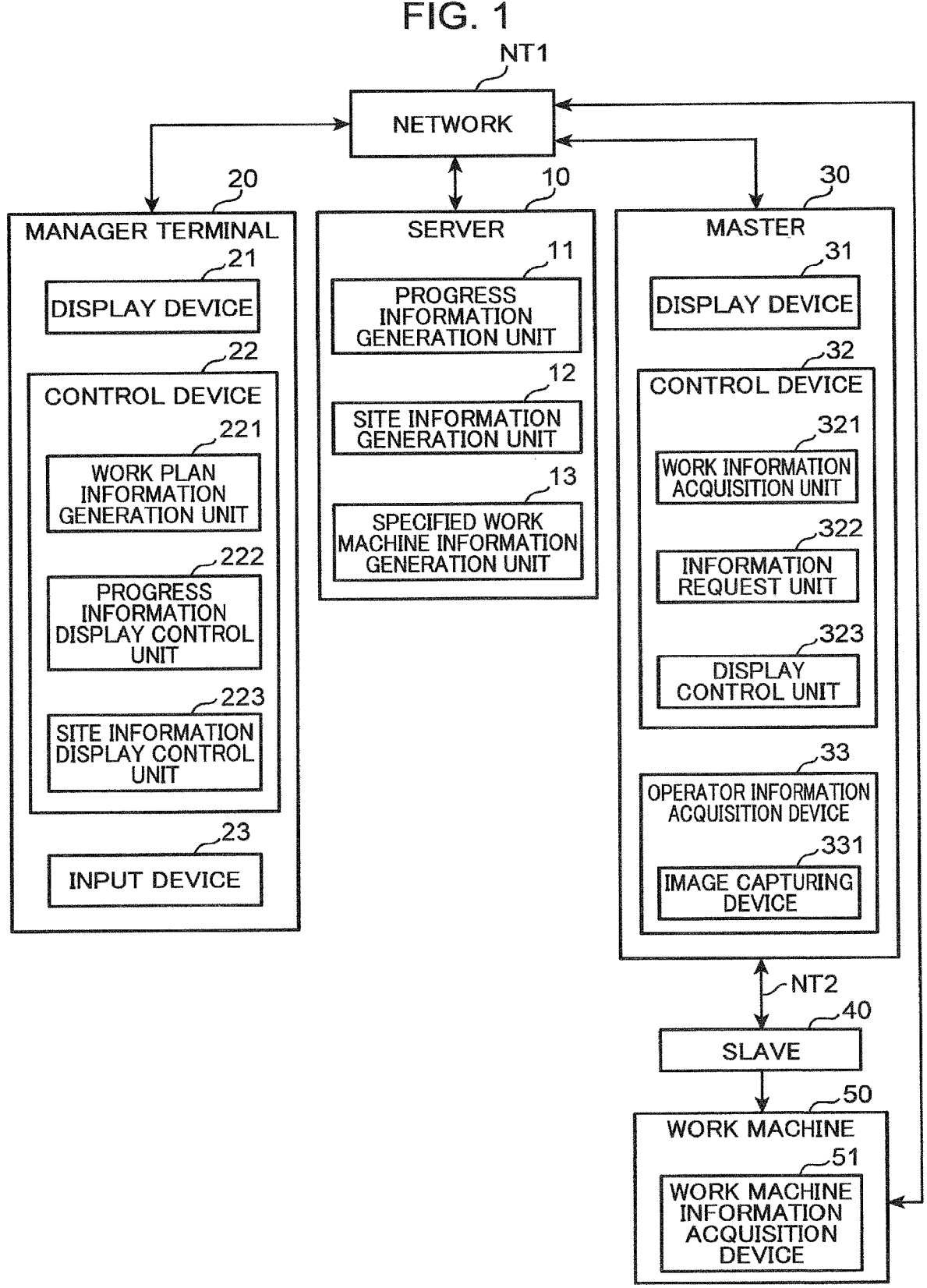
FIG. 1 is a block diagram showing an overall configuration of a construction management system according to an embodiment of the present invention.

FIG. 1 is a block diagram showing an overall configuration of a construction management system according to the embodiment of the present invention. The construction management system manages work progress at a work site by a plurality of work machines 50, each of which is remotely operated. The construction management system includes a server 10, a manager terminal 20, and a plurality of masters 30 provided correspondingly to the plurality of work machines 50.

The server 10 is a device that presents the work progress by the work machine 50 remotely operated by each of the plurality of masters 30 to a construction manager. Here, the construction manager is a person who manages the work progress at the work site, and is, for example, an employee who belongs to a work contracting company. Note that the work contracting company may be the same as a work ordering company or may be a company different from the work ordering company. Note that details of the server 10 will be described later.

The manager terminal 20 is a device for the construction manager to manage the work progress by the work machine remotely operated by each of the plurality of masters 30. Note that details of the manager terminal 20 will be described later.

The master 30 is one example of a remote operation device that remotely operates the work machine 50. In the present embodiment, the master 30 includes an operation device simulating a cab of the work machine 50. An operation lever similar to an operation lever of the work machine 50 is disposed at a position similar to a position in the work machine 50.

The master 30 includes a seat on which an operator is seated, a display device 31 disposed forward of the seat and displaying a surrounding image of the work machine 50 (surrounding image), a control device 32 that manages overall control of the master 30, and an operator information acquisition device 33.

The operator operates the operation lever to remotely operate the work machine 50 while looking at the surrounding image displayed on the display device 31. The operator is, for example, an employee employed by the work contracting company.

The control device 32 includes, for example, a processor such as a CPU, and manages overall control of the master 30. The control device 32 includes a work information acquisition unit 321, which is a work information acquisition device, an information request unit 322, and a display control unit 323.

The work information acquisition unit 321 acquires work information. The work information is information regarding a work situation by the work machine 50 that is remotely operated by the master 30. The work information is, for example, the time during which the work is performed by the work machine 50. In more detail, the work time is, for example, cumulative time of the work for each work item from the start of the work to the present time on the day.

Note that the work information is not limited to the time while the work is performed by the work machine 50. Various pieces of information can be employed as the work information according to the work item by the work machine 50.

For example, when the work item by the work machine 50 is "digging", the amount of dug soil can be employed as the work information. When the amount of dug soil is employed as the work information, the work progress can be determined by comparing the amount of dug soil with the amount of soil to dig.

Alternatively, an image obtained by capturing the actual work site from the sky can be employed as the work information. In this case, the work progress can be determined by comparison with a construction drawing D1.

Meanwhile, the work information acquisition unit 321 inputs the acquired work information into the server 10. Specifically, the work information is input into the server 10 by a communication device of the master 30 transmitting the work information to the server 10 via a network NT1.

The information request unit 322 generates an information request signal and inputs the generated information request signal into the server 10.

The information request signal is a signal for requesting specified work machine information from the server 10. The specified work machine information is, among the plurality of work machines 50, information regarding the work machine 50 other than the work machine 50 that is remotely operated by the master 30, the work machine 50 being displayed on the display device 31 of the master 30. That is, the specified work machine information is information regarding the work machine 50 that is present around the work machine 50 remotely operated by the master 30 and is displayed on the display device 31 of the master 30. The specified work machine information includes information common to work machine information described later. The specified work machine information includes information regarding the work progress by the work machine 50 corresponding to the work machine information among the plurality of work machines 50.

The information request signal is generated, for example, at timing when the operator tries to obtain the specified work machine information. Whether the operator is trying to obtain the specified work machine information is determined based on, for example, the line of sight of the operator, that is, based on whether the operator is looking at the work machine 50 displayed on the display device 31.

The display control unit 323 causes the display device 31 to perform display based on the specified work machine information. The display control unit 323 may display all of the specified work machine information on the display device 31, or may display a part of the specified work machine information on the display device 31. Even when all of the specified work machine information is displayed on the display device 31, it is not necessary to display all of the specified work machine information simultaneously. For example, the specified work machine information may be displayed more than once. When the specified work machine information is displayed more than once, the information to be displayed may be switched by, for example, an operation by the operator.

The operator information acquisition device 33 acquires operator information and inputs the acquired operator information into the server 10.

The operator information is information regarding the operator who remotely operates the work machine 50. The operator information includes information for identifying the operator and information for identifying correspondence between the operator and the work machine 50 remotely operated by the operator. The information regarding the operator includes, for example, the operator's name, ID, and nationality, communication address of the master 30, and the like.

The operator information acquisition device 33 includes an image capturing device 331. The image capturing device 331 captures an image of the face of the operator who is remotely operating the work machine 50. In the present embodiment, the operator information includes the image of the face of the operator captured by the image capturing device 331 as the information for identifying the operator.

A slave 40 is a slave operation device that is disposed in the cab of the work machine 50 and directly operates the operation lever disposed in the cab of the work machine 50 based on the operation amount received by the master 30. The slave 40 is, so to speak, a machine that operates the work machine 50 as an operator's dummy.

The work machine 50 is subjected to remote operation by the master 30. The work machine 50 is, for example, a hydraulic excavator, a hydraulic crane, or the like.

The work machine 50 includes a work machine information acquisition device 51. The work machine information acquisition device 51 acquires the work machine information.

The work machine information is information regarding the work machine 50. The work machine information includes information regarding the work by the work machine 50. The information regarding the work by the work machine 50 includes information regarding a position of the work machine 50 at the work site where the work is performed by the work machine 50. The information regarding the position of the work machine 50 is acquired, for example, by using GPS.

Also, the work machine information acquisition device 51 inputs the acquired position information into the server 10. Specifically, a communication device of the work machine 50 transmits the work machine information to the server 10 via the network NT1, whereby the work machine information is input into the server 10.

The server 10, the manager terminal 20, and the master 30 are connected via the network NT1 to allow communication with each other. As the network NT1, a long distance communication network including the Internet, a mobile phone communication network, and the like can be employed.

The master device 30 and the slave device 40 are connected via a communication path NT2 to allow communication with each other. As the communication path NT2, a communication path is employed that allows wireless communication between the master device 30 and the slave device 40 at a distance of several tens to several hundreds of meters, such as specific low power radio and Bluetooth (registered trademark). However, this is one example, and the master device 30 and the slave device 40 may be connected via the network NT1. In this case, the master device 30 and the slave device 40 can perform long-distance communication. Alternatively, wired communication may be employed as the communication path NT2.

The manager terminal 20 includes a computer such as a personal computer possessed by the construction manager. The manager terminal 20 includes a display device 21, a control device 22, and an input device 23.

The display device 21 includes, for example, a liquid crystal display. The control device 22 includes, for example, a processor such as a CPU, and manages overall control of the manager terminal 20. The input device 23 is, for example, a keyboard and a mouse, and is used when the construction manager inputs work plan information.

The control device 22 includes a work plan information generation unit 221, a progress information display control unit 222, and a site information display control unit 223. These components will be described below.

The work plan information generation unit 221 generates the work plan information. The work plan information is information regarding a work plan by the plurality of work machines 50. The work plan information is set for each operator who remotely operates the plurality of work machines 50, and includes the work item by the work machine 50 remotely operated by the operator and the work time for the work item. The work plan information is generated based on contents input by the construction manager using the input device 23. Note that details of the work plan information will be described later.

Also, the work plan information generation unit 221 inputs the generated work plan information into the server 10. Specifically, a communication unit of the manager terminal 20 transmits the work plan information to the server 10 via the network NT1, whereby the work plan information is input into the server 10.

The progress information display control unit 222 displays, on the display device 21, progress information that is information to present to the construction manager and information regarding the work progress by the plurality of work machines 50. Note that the progress information will be described later.

The site information display control unit 223 displays, on the display device 21, site information that is information to present to the construction manager and information indicating the relationship between the position of the plurality of work machines 50 at the work site and the operator who remotely operates the plurality of work machines 50. Note that details of the site information will be described later.

Figure 2A:
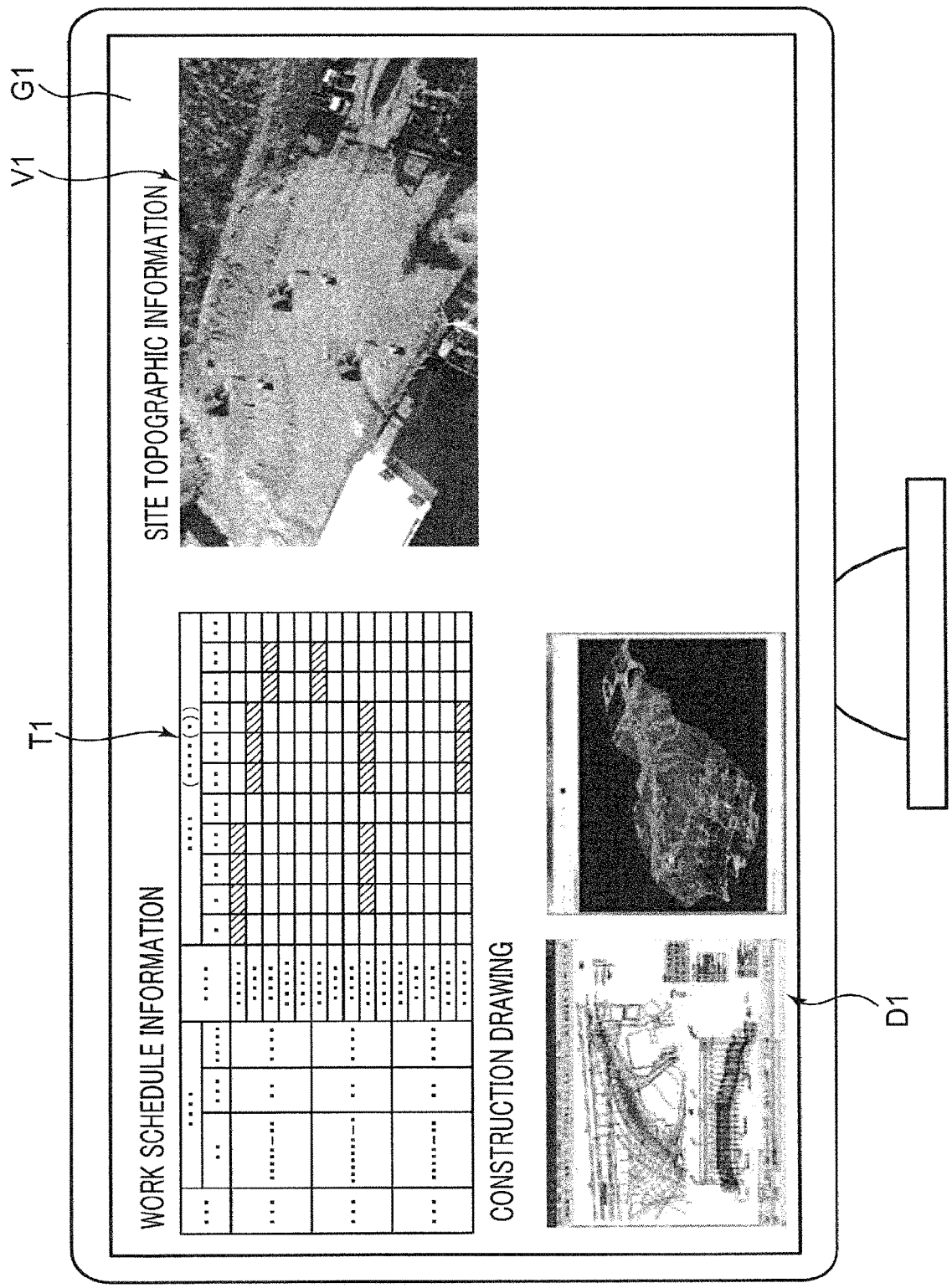
FIG. 2A is a view showing one example of a screen displayed on a manager terminal when a construction manager inputs work plan information.

FIG. 2A is a view showing one example of a screen G1 displayed on the manager terminal 20 when the construction manager inputs the work plan information. The screen G1 displays table T1 indicating work schedule information, the construction drawing D1, and a site topographic image V1 indicating site topographic information. FIG. 2B is an enlarged view of table T1.

Table T1 has a "work machine" column. The work machine 50 to use is input into the "work machine" column.

Reference is made to FIG. 2B. Table T1 has a "machine information" column. The "machine information" column includes "model", "ATT", and "tip AFT" columns.

The type of work machine 50 to use is input into the "model" column.

The type of attachment included in the work machine 50 to use is input into the "ATT" column. "ATT" indicates the type of attachment included in the work machine 50, such as, for example, standard, long range, separate, three-fold, and short arm. For example, an attachment whose ATT is "standard" includes a boom and an arm.

The type of tip attachment is input into the "tip ATT" column. "Tip ATT" indicates the type of tip attachment attached to the tip of the attachment, such as, for example, a bucket, a rotating grapple, a mechanical grapple, a small split nibbler, and a large split nibbler.

Note that "model", "ATT", and "tip ATT" are one example of a plurality of parameters regarding the specifications of the work machine 50.

Table T1 has a "work item" column. Work items by the work machine 50 such as, for example, digging, loading, and leveling of level ground are input into the "work item" column. Five work items of "digging and loading", "leveling of level ground", "shaping of level ground", "leveling of slope face" and "shaping of slope face" are input into table T1.

"Digging and loading" is a work item for digging soil, ground, and rock and loading on a dump truck. "Leveling of level ground" is a work item for leveling the level ground shaped by "shaping of level ground". "Shaping of level ground" is a work item for removing irregularities on the ground to create a flat ground. "Leveling of slope face" is a work item for leveling the slope face shaped by "shaping of slope face". "Shaping of slope face" is a work item for shaping the slope face, which is an artificial slope created by cutting or embankment. Note that the work items listed in FIG. 2B are only one example, and other work items may be included.

Table T1 has a "work schedule" column. A timetable of work to be performed by each of the plurality of work machines 50 is input into the "work schedule" column. In other words, required time for each work to be performed by each of the plurality of work machines 50 is input into the "work schedule" column.

In the example shown in FIG. 2B, for one work machine 50, the "work schedule" column is divided into a grid by a plurality of vertical lines that divides the time from 8:00 to 18:00 hourly and a plurality of horizontal lines that divides the grid for each work item. The construction manager inputs the work schedule by inputting the operation of selecting a desired cell (for example, click and drag).

In the example shown in FIG. 2B, for "unit 1" of the work machine 50, the work of "digging and loading" is scheduled in the time zone from 8:00 to 11:00, the work of "leveling of level ground" is scheduled in the time zone from 13:00 to 15:00, and the work of "shaping of level ground" is scheduled in the time zone from 16:00 to 17:00.

Reference is made to FIG. 2A. The construction drawing D1 is, for example, data indicating topography of the work site created in advance by CAD or the like. The work by the plurality of work machines 50 is performed according to the construction drawing D1.

The site topographic image V1 is an image indicating the topography of the work site where the work is performed by the plurality of work machines 50. The site topographic image V1 is, for example, an image obtained by capturing the work site from the sky by a camera mounted on a drone or a camera installed at the work site. Alternatively, the site topographic image V1 may be an image captured by a camera installed in the main body of the work machine 50. The site topographic image V1 may be an image updated at appropriate intervals (still image) or a real-time image (moving image).

When the input into the screen shown in FIG. 2A is completed, the construction manager presses a transmission button (not shown). With this operation, the manager terminal 20 receives the input of the work plan information and transmits the work plan information to the server 10. The work plan information includes the information input into each column of table T1, the construction drawing D1, and the site topographic image V1. Here, the information input into each column of table T1 is, for example, information in which "machine information", "work item", and required time for each work item are associated with one another for each of one or more construction machines.

Descriptions will be given again with reference to FIG. 1. The server 10 includes a computer having a processor such as a CPU, a memory, and a communication function. The server 10 includes a progress information generation unit 11, a site information generation unit 12, and a specified work machine information generation unit 13.

The progress information generation unit 11 generates the progress information to present to the construction manager based on the work plan information input from the manager terminal 20 and the work information input from the work information acquisition unit 321. The progress information generation unit 11 inputs the generated progress information into the manager terminal 20.

The progress information is information regarding the work progress by the plurality of work machines 50. The progress information indicates the work progress for each operator who remotely operates the plurality of work machines 50. The progress information is represented as, for example, the relationship between the required time set for each work item included in the work plan information and the actual work time included in the work information.

The progress information will be described with reference to FIG. 3. FIG. 3 is a view showing one example of a screen G2 displayed on the manager terminal 20 when the construction manager manages the work progress by the plurality of work machines 50. The screen G2 displays table T2 indicating the progress information.

Table T2 has a "work machine" column. In the "work machine" column, information for identifying the work machine 50 working at the work site (here, name) is displayed.

Table T2 has an "operator information" column. In the "operator information" column, columns of "live video", "name", "rank", "physical condition", "remote operation location", "nationality", and "work time" are provided. Note that out of various information items displayed in the "operator information" column, information other than "live video" is stored in an operator database (not shown) provided in the server 10. The operator database stores the operator's name, rank, physical condition, remote operation location, nationality, and work time in association with an identifier (ID) of the work machine 50 remotely operated by the operator. The work time is cumulative time from the start of work to the present time on this day (April 3). For example, for the operator (Kobelco Taro) on the first line, since the cumulative work time to the present time is 5 hours and 30 minutes, "5 hours 30 minutes" is displayed in the "work time" column.

In the "live image" column, an image obtained by capturing the face of the operator remotely operating the work machine 50 is displayed. The image is captured by the image capturing device 331 disposed in the master 30.

In the "name" column, the operator's name is displayed.

In the "rank" column, a rank indicating a skill level of the operator is displayed. The skill level of the operator is determined, for example, based on a past work record of the operator and the like.

In the "physical condition" column, the physical condition of the operator who is remotely operating the work machine 50 is displayed. As the physical condition, for example, a result determined based on the face image of the operator captured by the image capturing device 331 may be displayed, or the physical condition may be displayed based on the operator's declaration.

In the "remote operation location" column, the location where the operator is remotely operating the work machine 50 is displayed.

In the "nationality" column, the operator's nationality is displayed.

In the "work time" column, the time during which the operator remotely operates the work machine 50 to perform the work by the work machine 50 is displayed.

Table T2 has a "work item" column. In the "work item" column, the work items input into table T1 indicating the work schedule information (five work items of "digging and loading", "leveling of level ground", "shaping of level ground", "leveling of slope face" and "shaping of slope face") are displayed.

Table T2 has a "progress situation" column. In the "progress situation" column, the work progress situation is displayed for each work item performed by each of the plurality of work machines 50.

In the example shown in FIG. 3, for "unit 1" of the work machine 50 remotely operated by an operator "Kobelco Taro", work of "digging and loading" is scheduled in the time zone from 8:00 to 11:00, work of "leveling of level ground" is scheduled in the time zone from 13:00 to 15:00, and work of "shaping of level ground" is scheduled in the time zone from 16:00 to 17:00.

Calculation of the work progress situation includes, for example, (1) aspect of calculation from the actual work time and (2) aspect of calculation from the actual work amount.

For (1), a progress rate is calculated for each work item by dividing the actual work time by work schedule time (required time) for each work item. In the example shown in FIG. 3, the actual work time of "digging and loading" is four hours, and the work schedule time is four hours, and thus the progress rate is 100%. Therefore, four cells in the time zone from 8:00 to 11:00 are displayed in first color indicating that the work is finished. Meanwhile, for "leveling of level ground", the work schedule time is 3 hours, whereas the actual work time is 1 hour 30 minutes, and thus the progress rate is 50%. Therefore, 1.5 cells of first half of three cells are displayed in first color, and remaining 1.5 cells are displayed in second color, which indicates that the work is incomplete. Note that the actual work time is included in the work information, and the work schedule time (required time) is included in the work plan information.

For (2), the progress rate is calculated for each work item by dividing the actual work amount by the scheduled work amount for each work item. For example, for "digging and loading", the progress rate is calculated by dividing the total weight of soil actually loaded by the work machine 50 by the total weight of soil to be loaded by the work machine 50 determined in advance from the work plan. The weight of soil is detected by, for example, a load sensor.

Descriptions will be given again with reference to FIG. 1. The site information generation unit 12 generates the site information based on the position information input from the work machine information acquisition device 51 and the operator information input from the operator information acquisition device 33, and inputs the generated site information into the manager terminal 20.

The site information is information to present to the construction manager, and indicates the relationship between the position of the plurality of work machines 50 at the work site and the operator who remotely operates the plurality of work machines 50.

Figure 4:
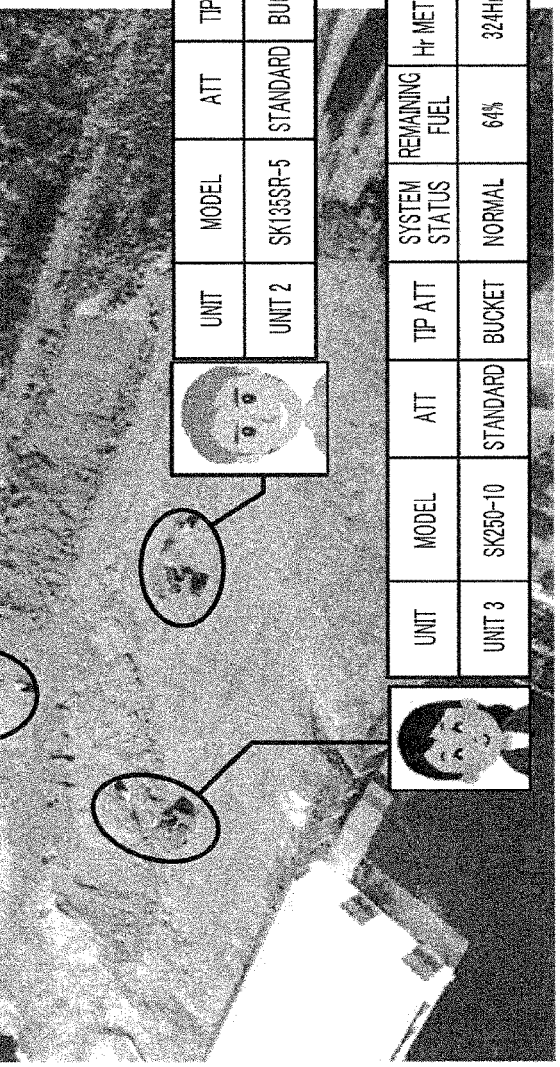
FIG. 4 is a view showing one example of the screen displayed on the manager terminal when the construction manager manages the work progress by the plurality of work machines.

The site information will be described with reference to FIG. 4. FIG. 4 is a view showing one example of a screen G3 displayed on the manager terminal 20 when the construction manager manages the work progress by the plurality of work machines 50. The screen G3 displays information J0 on the work machine 50 existing at the work site together with the site topographic image input into the manager terminal 20 as the site information.

Descriptions will be given again with reference to FIG. 1. The specified work machine information generation unit 13 generates the specified work machine information based on the information request signal input from the information request unit 322. Also, the specified work machine information generation unit 13 inputs the generated specified work machine information into the master 30 including the information request unit 322 that has input the information request signal.

Figure 5:
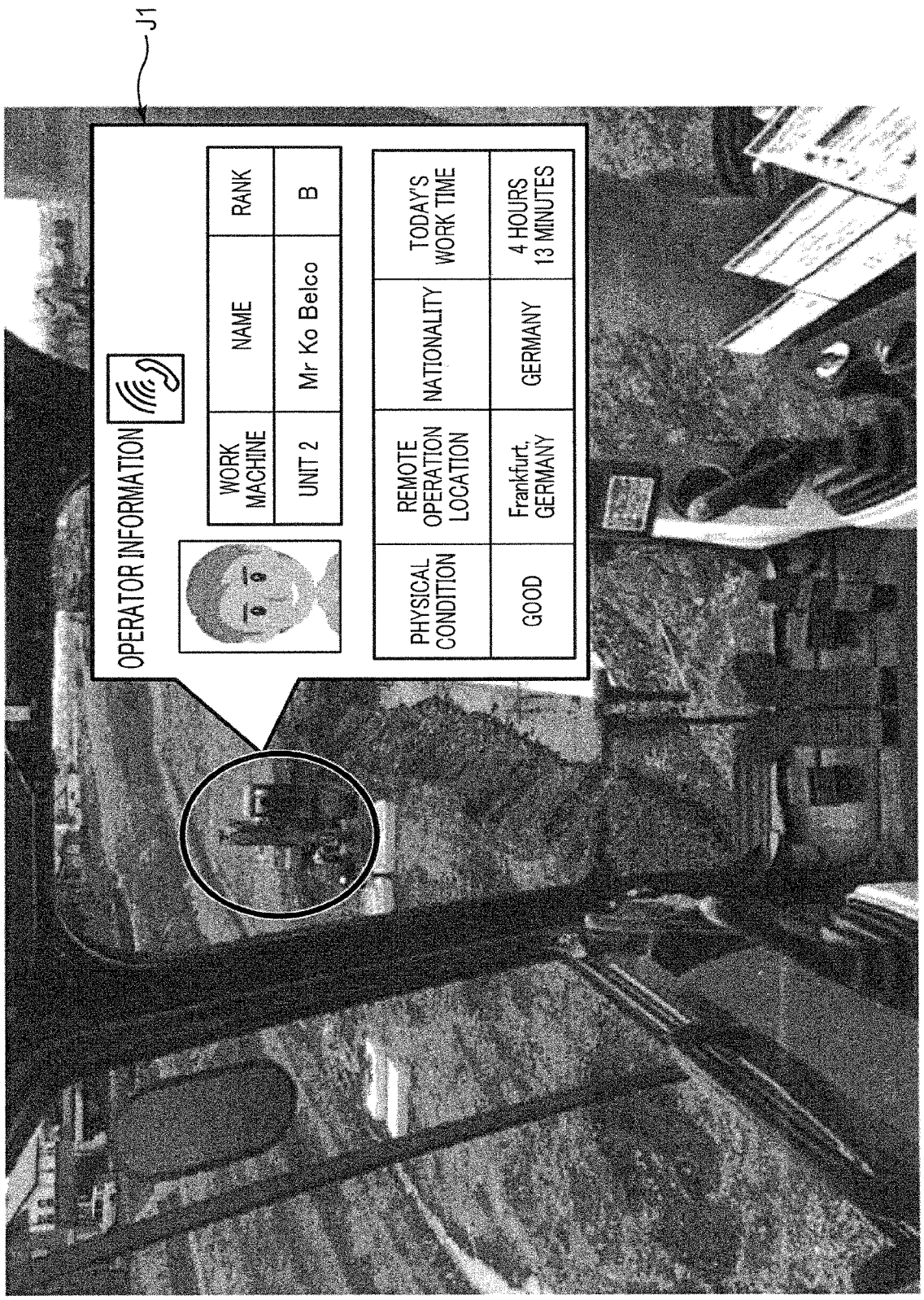
FIG. 5 is a view showing one example of work machine information displayed on a display device of a master.
Figure 6:
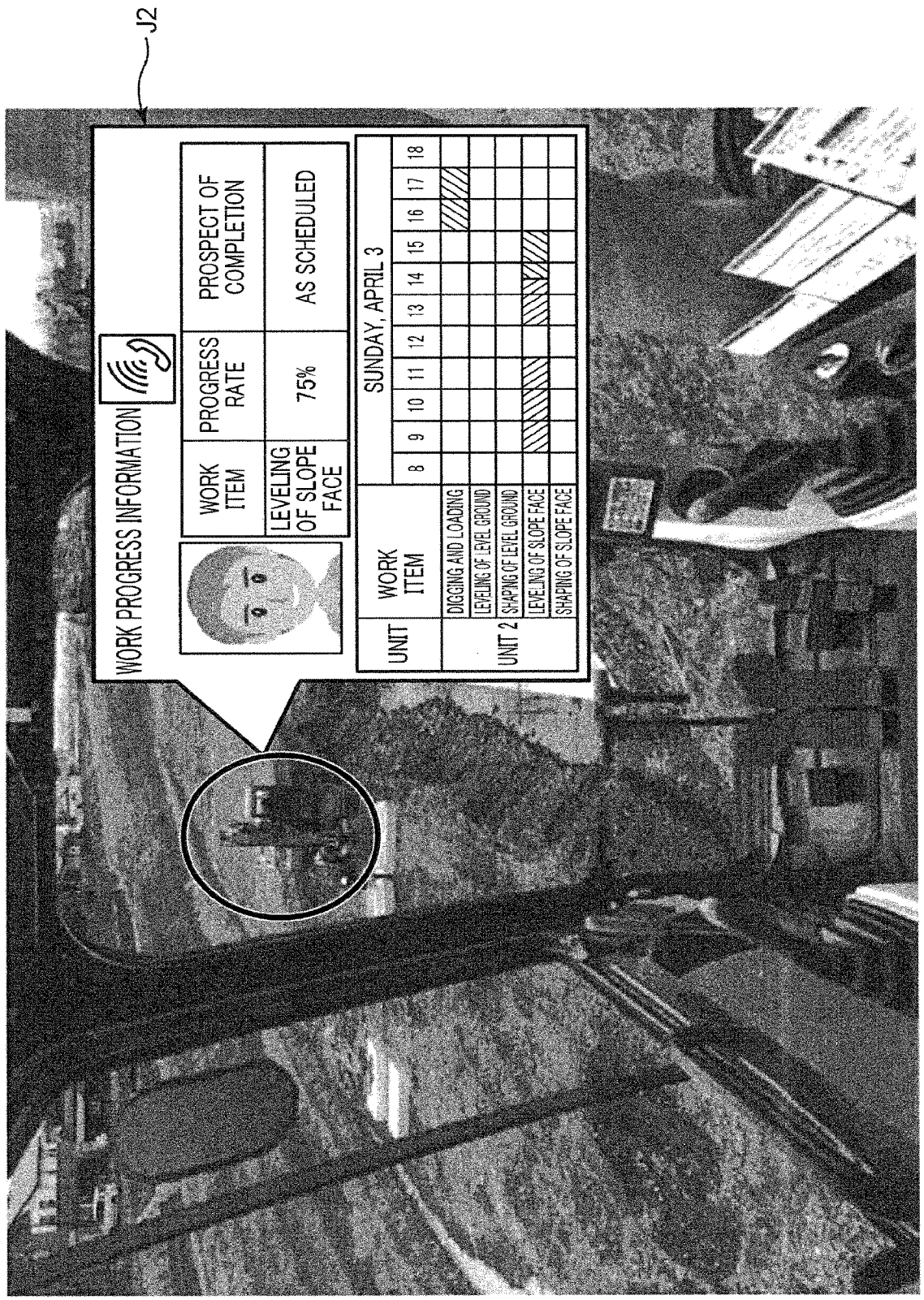
FIG. 6 is a view showing one example of the work machine information displayed on the display device of the master.
Figure 7:
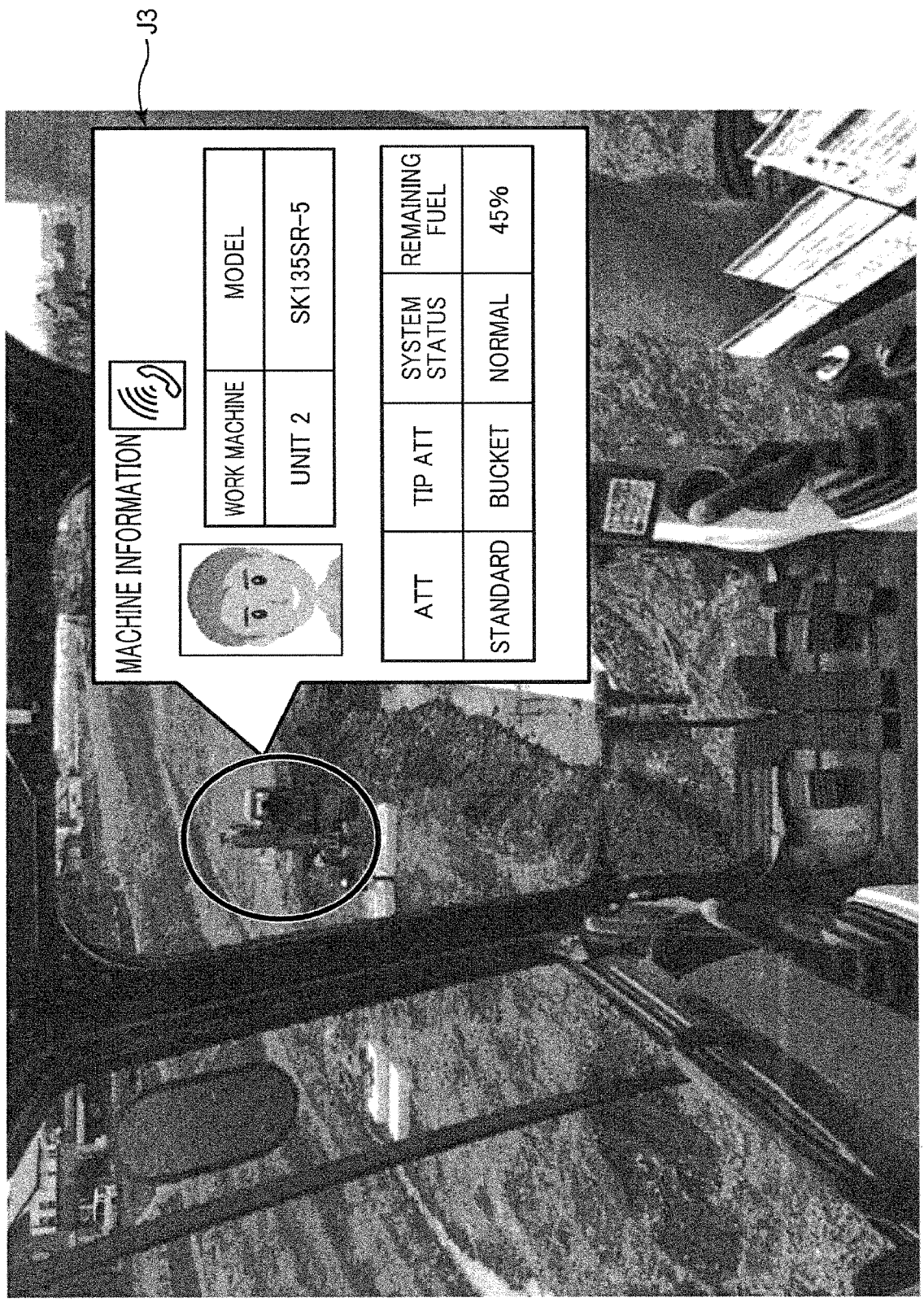
FIG. 7 is a view showing one example of the work machine information displayed on the display device of the master.

The work machine information will be described with reference to FIGS. 5 to 7. FIGS. 5 to 7 are each a view showing one example of the work machine information displayed on the display device 31 of the master 30. FIG. 5 displays information J1 regarding the operator remotely operating the work machine 50 as the work machine information. FIG. 6 displays information J2 regarding the work progress by the work machine 50 as the work machine information. FIG. 7 displays information J3 regarding the situation of the work machine 50 as the work machine information. Such specified work machine information is switched, for example, by the operator operating an operating unit (not shown).

With reference to FIG. 8, various processes to be executed by the construction management system according to the embodiment of the present invention will be described. FIG. 8 is a flowchart showing various processes to be executed by the construction management system according to the embodiment of the present invention.

[Processing to Generate and Display Progress Information]

In S101, the manager terminal 20 receives the work plan information input by the construction manager. In S102, the manager terminal 20 transmits the work plan information received in S101 to the server 10. In S201, the server 10 receives the work plan information transmitted from the manager terminal 20.

In S301, the master 30 acquires the work information. In S302, the master 30 transmits the work information acquired in S301 to the server 10.

In S202, the server 10 receives the work information transmitted from the master 30. In S203, the server 10 generates the progress information based on the work schedule information included in the work plan information received in S201 and the work information received in S202. In S204, the server 10 transmits the progress information generated in S203 to the manager terminal 20.

In S103, the manager terminal 20 receives the progress information transmitted from the server 10. In S104, the manager terminal 20 displays the progress information received in S103 on the display device 21 (see FIG. 3).

[Processing to Generate and Display Site Information]

In S401, the work machine information acquisition device 51 included in the work machine 50 acquires the work machine information. In S402, the work machine information acquisition device 51 included in the work machine 50 transmits the work machine information acquired in S401 to the server 10.

In S205, the server 10 receives the work machine information transmitted from the work machine information acquisition device 51 included in the work machine 50. In S206, the server 10 generates the site information based on the site topographic information included in the work plan information received in S201 and the work machine information received in S205. In S207, the server 10 transmits the site information generated in S206 to the manager terminal 20.

In S105, the manager terminal 20 receives the site information transmitted from the server 10. In S106, the manager terminal 20 displays the site information received in S105 on the display device 21 (see FIG. 4).

[Processing to Generate and Display Specified Work Machine Information]

In S303, the master 30 generates the information request signal. In S304, the master 30 transmits the information request signal generated in S303 to the server 10.

In S208, the server 10 receives the information request signal transmitted from the master 30. In S209, the server 10 generates the specified work machine information. In S210, the server 10 transmits the specified work machine information generated in S209 to the master 30.

In S305, the master 30 receives the specified work machine information transmitted from the server 10. In S306, the master 30 displays the specified work machine information received in S305 on the display device 31.

In such a construction management system, the work plan information created based on contents input by the construction manager and the work information indicating the work situation at the work site are put together in the server 10, and the progress information generated using the information is supplied to the manager terminal 20. As a result, the construction manager can determine the work progress of each work machine 50 in the manager terminal 20. Therefore, the construction management system allows easy management of the work progress by the remotely operated work machine 50.

Also, in the construction management system, the work machine information including the position information on the work machine 50 at the work site and the operator information about the operator remotely operating the work machine 50 are put together in the server 10, and the site information generated using the information is supplied to the manager terminal 20. As a result, the construction manager can determine, in the manager terminal 20, the work situation by the work machine 50 at the work site. That is, the construction management system makes it possible to determine not only the work progress by the remotely operated work machine 50 but also the work situation by the work machine 50 at the work site.

Also, the construction management system displays the information regarding another work machines 50 existing around the work machine 50 that is remotely operated by the operator (specified work machine information) on the display device 31 provided in the master 30 used when the operator remotely operates the work machine 50. This allows the operator who remotely operates the work machine 50 to acquire the information regarding another work machine 50 existing around the work machine 50.

Also, in the construction management system, since the specified work machine information includes the information regarding the work progress by the work machine 50 corresponding to the specified work machine information among the plurality of work machines 50, the operators who remotely operate the work machines 50 can share the information regarding the work progress.

The embodiment of the present invention has been described above in detail, but this is merely an example, and the present invention is not limited to the embodiment.

In the above embodiment, when the operator operates the operation lever provided in the master 30, the slave 40 disposed in the driver's seat of the work machine 50 operates the operation lever of the work machine 50. However, for example, aspects may be employed in which the slave 40 does not exist, or the work machine 50 does not include the operation lever.

In the above embodiment, the plurality of work machines 50 is remotely operated, but the number of work machines 50 remotely operated may be one.

In the above embodiment, the information regarding another work machines 50 existing around the work machine 50 that is remotely operated by the operator (specified work machine information) is displayed on the display device 31 provided in the master 30 used when the operator remotely operates the work machine 50. However, such an aspect is not essential in the construction management system according to the present invention.

In the above embodiment, the work machine information including the position information on the work machine 50 at the work site and the operator information about the operator who remotely operates the work machine 50 are put together in the server 10, and the site information generated using the information is supplied to the manager terminal 20. However, such an aspect is not essential in the construction management system according to the present invention.

In the construction management system according to the present invention, the operators who remotely operate the plurality of work machines may be allowed to communicate with each other.

CONCLUSION OF EMBODIMENT

A construction management system according to the present invention is a construction management system for managing work progress at a work site by at least one work machine that is remotely operated. The construction management system includes: a manager terminal configured to allow a construction manager to manage the work progress by the at least one work machine; a server connected to the manager terminal to allow communication; and at least one work information acquisition device provided corresponding to the at least one work machine and configured to acquire work information regarding a work situation of the at least one work machine and to input the work information into the server, in which the manager terminal includes a work plan information generation unit configured to generate work plan information regarding a work plan of the at least one work machine based on contents input by the construction manager and to input the work plan information into the server, the work plan information is set for each operator who remotely operates the at least one work machine and includes a work item of the work machine remotely operated by each operator and work time for the work item, and the server includes a progress information generation unit configured to generate progress information indicating the work progress of the operator, to input the progress information into the manager terminal, and to present the progress information to the construction manager for each of the at least one work machine based on the work plan information and the work information.

In the construction management system, the work plan information created based on contents input by the construction manager and the work information indicating the work situation at the work site are put together in the server, and the progress information generated using the information is supplied to the manager terminal. As a result, the construction manager can determine the work progress of each work machine in the manager terminal. Therefore, the construction management system allows easy management of the work progress by the remotely operated work machine.

Preferably, the construction management system further includes: at least one work machine information acquisition device provided corresponding to the at least one work machine and configured to acquire work machine information including information regarding a position of the work machine at the work site and to input the work machine information into the server; and at least one operator information acquisition device provided corresponding to the at least one work machine and configured to acquire operator information that is information regarding the operator who remotely operates the work machine and to input the operator information into the server, in which the server further includes a site information generation unit configured to generate site information indicating a relationship between a position of the work site and the operator who performs remote operation and to input the site information into the manager terminal for each of the at least one work machine based on the work machine information and the operator information.

In such an aspect, the work machine information including the position information on the work machine at the work site and the operator information about the operator remotely operating the work machine are put together in the server, and the site information generated using the information is supplied to the manager terminal. As a result, the construction manager can determine, in the manager terminal, the work situation by the work machine at the work site. That is, in the above aspect, not only the work progress by the remotely operated work machine but also the work situation by the work machine at the work site can be determined.

Preferably, the construction management system further includes at least one remote operation device provided corresponding to the at least one work machine, used to remotely operate the at least one work machine, and connected to the server, in which the at least one remote operation device includes a display device configured to display a surrounding image of the corresponding work machine, the at least one work machine includes a plurality of work machines that allows individual remote operation, the at least one remote operation device includes a plurality of remote operation devices provided corresponding to the plurality of work machines, each of the plurality of remote operation devices further includes: an information request unit configured to generate an information request signal for requesting the server to acquire specified work machine information that is information regarding each of the work machines displayed on the display device among each of the work machines other than the corresponding work machine, and to input the information request signal into the server; and a display control unit configured to cause the display device to perform display based on the specified work machine information, and the server further includes a specified work machine information generation unit configured to generate the specified work machine information based on the information request signal input from the information request unit, and to input the specified work machine information into the remote operation device including the information request unit that inputs the information request signal.

In such an aspect, the information regarding another work machine existing around the work machine that is remotely operated by the operator is displayed on the display device provided in the remote operation device used when the operator remotely operates the work machine. This allows the operator who remotely operates the work machine to acquire the information regarding the other work machine existing around the work machine.

Preferably, in the construction management system, the specified work machine information includes information regarding the work progress by each of the work machines corresponding to the specified work machine information among the plurality of work machines.

In such an aspect, information regarding the work progress can be shared between operators who remotely operate the work machines.

Note that the present invention can be implemented as a construction management method including each process included in the construction management system. A construction management program for causing a computer to execute the construction management method can also be implemented. In this case, the construction management program can be recorded in a computer-readable non-transitory recording medium.

The invention claimed is:

1. A construction management system for managing work progress at a work site by at least one work machine that is remotely operated, the construction management system comprising:
a manager terminal configured to allow a construction manager to manage the work progress by the at least one work machine;
a server connected to the manager terminal to allow communication;
at least one work information acquisition device provided corresponding to the at least one work machine and configured to acquire work information regarding a work situation of the at least one work machine and to input the work information into the server; and
at least one remote operation device provided corresponding to the at least one work machine, used to remotely operate the at least one work machine from a different geographical location than the at least one work machine, the at least one remote operation device being connected to the server and there being no operator physically located at the at least one work machine,
wherein the at least one remote operation device includes a display device configured to display a surrounding image of the corresponding at least one work machine and an operation lever corresponding to a type of operation lever of the at least one work machine and that is disposed at a position corresponding to a position of the operation level of the at least one work machine, wherein the at least one remote operation device is configured such that the operator operates the operation lever of the least one remote operation device to remotely operate the at least one work machine while looking at the surrounding image displayed on the display device,
the manager terminal includes a work plan information generation unit configured to generate work plan information regarding a work plan of the at least one work machine based on contents input by the construction manager and to input the work plan information into the server,
the work plan information is set for each operator who remotely operates the at least one work machine and includes a work item of the work machine remotely operated by each operator and work time for the work item,
the server includes a progress information generation unit configured to generate progress information indicating the work progress of the operator for each operator, to input the progress information into the manager terminal, and to present the progress information to the construction manager for each of the at least one work machine based on the work information and the work plan information, and
the progress information is represented as a relationship between a required time set for each work item included in the work plan information and an actual work time included in the work information.

2. The construction management system according to claim 1, further comprising:
at least one work machine information acquisition device provided corresponding to the at least one work machine and configured to acquire work machine information including information regarding a position of the work machine at the work site and to input the work machine information into the server; and
at least one operator information acquisition device provided corresponding to the at least one work machine and configured to acquire operator information that is information regarding the operator who remotely operates the work machine and to input the operator information into the server,
wherein the server further includes a site information generation unit configured to generate site information indicating a relationship between a position of the work site and the operator who performs remote operation, to input the site information into the manager terminal, and to present the site information to the construction manager for each of the at least one work machine based on the work machine information and the operator information.

3. The construction management system according to claim 1,
- the at least one work machine includes a plurality of work machines that allows individual remote operation,
- the at least one remote operation device includes a plurality of remote operation devices provided respectively corresponding to the plurality of work machines,
- each of the plurality of remote operation devices further includes: an information request unit configured to generate an information request signal for requesting the server to acquire specified work machine information regarding each of the work machines displayed on the display device among each of the work machines other than the corresponding work machine, and to input the information request signal into the server; and a display control unit configured to cause the display device to perform display based on the specified work machine information, and
- the server further includes a specified work machine information generation unit configured to generate the specified work machine information based on the information request signal input from the information request unit, and to input the specified work machine information into the remote operation device including the information request unit that inputs the information request signal.

4. The construction management system according to claim 3, wherein the specified work machine information includes information regarding the work progress by each of the work machines corresponding to the specified work machine information among the plurality of work machines.

5. A method, implemented by a construction management system for managing work progress at a work site by at least one work machine that is remotely operated, the method comprising:
- allowing, by a manager terminal, a construction manager to manage the work progress by the at least one work machine;
- allowing communication by a server connected to the manager terminal;
- acquiring, by at least one work information acquisition device provided corresponding to the at least one work machine, work information regarding a work situation of the at least one work machine and to input the work information into the server; and
- remotely operating the at least one work machine, by at least one remote operation device provided corresponding to the at least one work machine, the at least one remote operation device being connected to the server and there being no operator physically located at the at least one work machine,
- wherein the at least one remote operation device includes a display device configured to display a surrounding image of the corresponding at least one work machine and an operation lever corresponding to a type of operation lever of the at least one work machine and that is disposed at a position corresponding to a position of the operation level of the at least one work machine, wherein the at least one remote operation device is configured such that the operator operates the operation lever of the least one remote operation device to remotely operate the at least one work machine while looking at the surrounding image displayed on the display device,
- the manager terminal includes a work plan information generation unit configured to generate work plan information regarding a work plan of the at least one work machine based on contents input by the construction manager and to input the work plan information into the server,
- the work plan information is set for each operator who remotely operates the at least one work machine and includes a work item of the work machine remotely operated by each operator and work time for the work item,
- the server includes a progress information generation unit configured to generate progress information indicating the work progress of the operator for each operator, to input the progress information into the manager terminal, and to present the progress information to the construction manager for each of the at least one work machine based on the work information and the work plan information, and
- the progress information is represented as a relationship between a required time set for each work item included in the work plan information and an actual work time included in the work information.

* * * * *